US008402769B2

(12) United States Patent
Maltson

(10) Patent No.: US 8,402,769 B2
(45) Date of Patent: Mar. 26, 2013

(54) CASING OF A GAS TURBINE ENGINE HAVING A RADIAL SPOKE WITH A FLOW GUIDING ELEMENT

(75) Inventor: John David Maltson, Skellingthorp (GB)

(73) Assignee: Siemens Aktiengesellschaft, München (DE)

( * ) Notice: Subject to any disclaimer, the term of this patent is extended or adjusted under 35 U.S.C. 154(b) by 909 days.

(21) Appl. No.: 12/524,766

(22) PCT Filed: Jan. 25, 2008

(86) PCT No.: PCT/EP2008/050867

§ 371 (c)(1),
(2), (4) Date: Jul. 28, 2009

(87) PCT Pub. No.: WO2008/092806

PCT Pub. Date: Aug. 7, 2008

(65) Prior Publication Data

US 2010/0031673 A1 Feb. 11, 2010

(30) Foreign Application Priority Data

Jan. 29, 2007 (EP) .................................... 07001910

(51) Int. Cl.
*F02C 7/20* (2006.01)
*F03B 1/00* (2006.01)
*F03D 5/00* (2006.01)

(52) U.S. Cl. ........... 60/796; 60/751; 60/39.37; 415/191; 415/208.1; 415/208.2; 415/209.4; 415/210.1

(58) Field of Classification Search ................. 60/39.37, 60/722, 751, 752, 758, 759, 760, 796, 805, 60/806; 415/115, 142, 191, 200, 208.1, 208.2, 415/209.4, 210.1, 211.2
See application file for complete search history.

(56) References Cited

U.S. PATENT DOCUMENTS

| | | | | | |
|---|---|---|---|---|---|
| 2,614,386 | A | * | 10/1952 | McLeod et al. | 60/39.37 |
| 2,630,679 | A | | 3/1953 | Sedille | |
| 2,735,612 | A | * | 2/1956 | Hausmann | 415/208.1 |
| 2,986,231 | A | * | 5/1961 | Hellstrom | 55/317 |
| 3,299,632 | A | * | 1/1967 | Coplin et al. | 60/746 |
| 3,631,672 | A | * | 1/1972 | Gentile et al. | 415/116 |
| 3,657,882 | A | * | 4/1972 | Hugoson | 60/798 |
| 3,704,075 | A | | 11/1972 | Karstensen | |
| 4,297,843 | A | * | 11/1981 | Sato et al. | 60/796 |
| 4,298,089 | A | | 11/1981 | Birch | |
| 4,903,477 | A | * | 2/1990 | Butt | 60/39.37 |
| 5,592,821 | A | | 1/1997 | Alary | |
| 6,672,070 | B2 | * | 1/2004 | Bland et al. | 60/772 |

FOREIGN PATENT DOCUMENTS

| | | | |
|---|---|---|---|
| DE | 4406399 | A1 | 10/1994 |
| EP | 0315486 | A2 | 5/1989 |
| GB | 898368 | A | 6/1962 |
| WO | WO 2006038879 | A1 | 4/2006 |

* cited by examiner

*Primary Examiner* — Ehud Gartenberg
*Assistant Examiner* — Michael B Mantyla

(57) ABSTRACT

A section of a gas turbine engine including a radial spoke is provided. The spoke includes an aerodynamic shape with a leading side and a trailing side and, extending from the leading side to the trailing side, a first side and a second side, opposite the first side. The spoke also includes at least one flow guiding element arranged on at least the first side.

18 Claims, 4 Drawing Sheets

CASING OF A GAS TURBINE ENGINE HAVING A RADIAL SPOKE WITH A FLOW GUIDING ELEMENT

CROSS REFERENCE TO RELATED APPLICATIONS

This application is the US National Stage of International Application No. PCT/EP2008/050867, filed Jan. 25, 2008 and claims the benefit thereof. The International Application claims the benefits of European application No. 07001910.4 EP filed Jan. 29, 2007, both of the applications are incorporated by reference herein in their entirety.

FIELD OF THE INVENTION

The present invention relates to the centre casing of a gas turbine engine.

BACKGROUND OF THE INVENTION

Many components of a gas turbine engine must be supported in such a manner that they are retained in an axial direction of the engine and in the circumferential direction of the casing. For this purpose, in the centre casing area of a gas turbine engine outer carrier rings support nozzle guide vanes or stator vanes. A carrier ring itself is supported either by spokes, which also support the bearing and therefore the shaft of the engine and carry oil and buffer or sealing air to and from the bearing, or a structural diaphragm type component further downstream. Spokes and diaphragm are held in place by an outer casing.

During operation of the gas turbine engine, where a part of the compressor air flows by the spokes in order to cool transition ducts or to provide cooling for the nozzle guide vanes at the entry of the turbine section, poor air flow characteristics in the centre casing area of a gas turbine engine can cause dead areas behind the spokes, leading to low heat transfer coefficients on the outer carrier rings and on the inside surface of the outer casing.

Up to now the casing flow has been allowed to recirculate with low velocity with flow separations behind the spoke frame.

SUMMARY OF THE INVENTION

An object of the invention is to provide an improved casing of a gas turbine engine with a spoke for reduced flow separation in the centre casing and higher heat transfer coefficients on the carrier rings and the casing.

This object is achieved by the claims. The dependent claims describe advantageous developments and modifications of the invention.

An inventive casing of a gas turbine engine comprises a spoke with at least one flow guiding element like an aerodynamic vane or a chute coupled with an aerodynamic shape of the spoke.

The aim of the spoke having an aerodynamic profile and turning vane(s) and/or chute(s) is to modify the flow of pressurised air exiting from a diffuser such that the flow is deflected from an axial direction in the turbine centre casing and is turned circumferentially about the axis of the machine. The aerodynamic shape of the spoke will reduce areas of separated flow, or dead areas behind the spoke. Induced by a vane-shaped flow guiding element, the swirling motion with increased flow velocity in the circumferential direction will improve the flow in the centre casing, with reduced flow separations and increased heat transfer coefficients on the structural carrier rings and turbine casing components. The flow is expected to swirl in the cavity.

It is advantageous to arrange the flow guiding element in a central circumferential area of the spoke relative to a radial axis along which the inventive spoke extends, promoting the deflection of compressed air exiting the diffuser.

In another advantageous embodiment the flow guiding element extends to a trailing side of the spoke, to intensify the swirling motion of the deflected air.

To further increase the deflecting and swirling effect, more than only one flow guiding element can be arranged on the inventive spokes. Flow guiding elements can be arranged on different sides of a spoke. The size and orientation of the flow guiding elements do not need to be identical. It may even be advantageous to have an asymmetric arrangement of flow guiding elements regarding size and orientation with respect to the fluid flow direction to achieve an improved swirling motion.

The inventive casing of a gas turbine engine with spokes having flow guiding elements is easy to fabricate. Flow guiding elements can be refitted to centre casings already in use. Flow guiding elements can be of a sheet metal, ceramics or they could comprise a plurality of filaments of carbon or Kevlar fibres.

In advantageous embodiments, flow guiding elements are welded or brazed onto the spoke.

In another advantageous embodiment, spoke and flow guiding element are cast in one piece.

In order to smoothly redirect the air flow, it is advantageous, when the flow guiding element is an aerodynamic vane.

It is also advantageous when the leading edge region of the flow guiding element is inclined relative to a trailing edge region of the flow guiding element, thus increasing the deflecting effect. The bending angle of the flow guiding element between the leading edge region and the trailing edge region is in the range between 120° (strongly bent) and 170° (slightly bent). Even if an optimum bending angle depends on different factors, like, for example machine load, 150° result as a good value for standard machine settings.

It may be advantageous to have flow guiding elements adaptable to different machine load conditions. Therefore the bending angle between the leading edge region and the trailing edge region of the flow guiding element is designed to be adjustable. But also the positioning of the entire flow guiding element on the spoke may be adjusted in radial height and extension to the trailing side of the spoke.

In another advantageous embodiment, a chute with a longitudinal axis parallel to the radial axis of the spoke is arranged in a region close to the trailing side of the spoke in order to turn air into a circumferential direction about the axis of the gas turbine engine.

It is particularly advantageous when aerodynamic vanes and chutes are combined. With this combination, compressor air is first deflected into a substantially axial direction and then turned into a circumferential direction about the axis of the gas turbine engine.

It is particularly advantageous to use the inventive spokes in casings surrounding combustors of gas turbine engines.

BRIEF DESCRIPTION OF THE DRAWINGS

The invention will now be further described with reference to the accompanying drawings in which.

Figure 1:
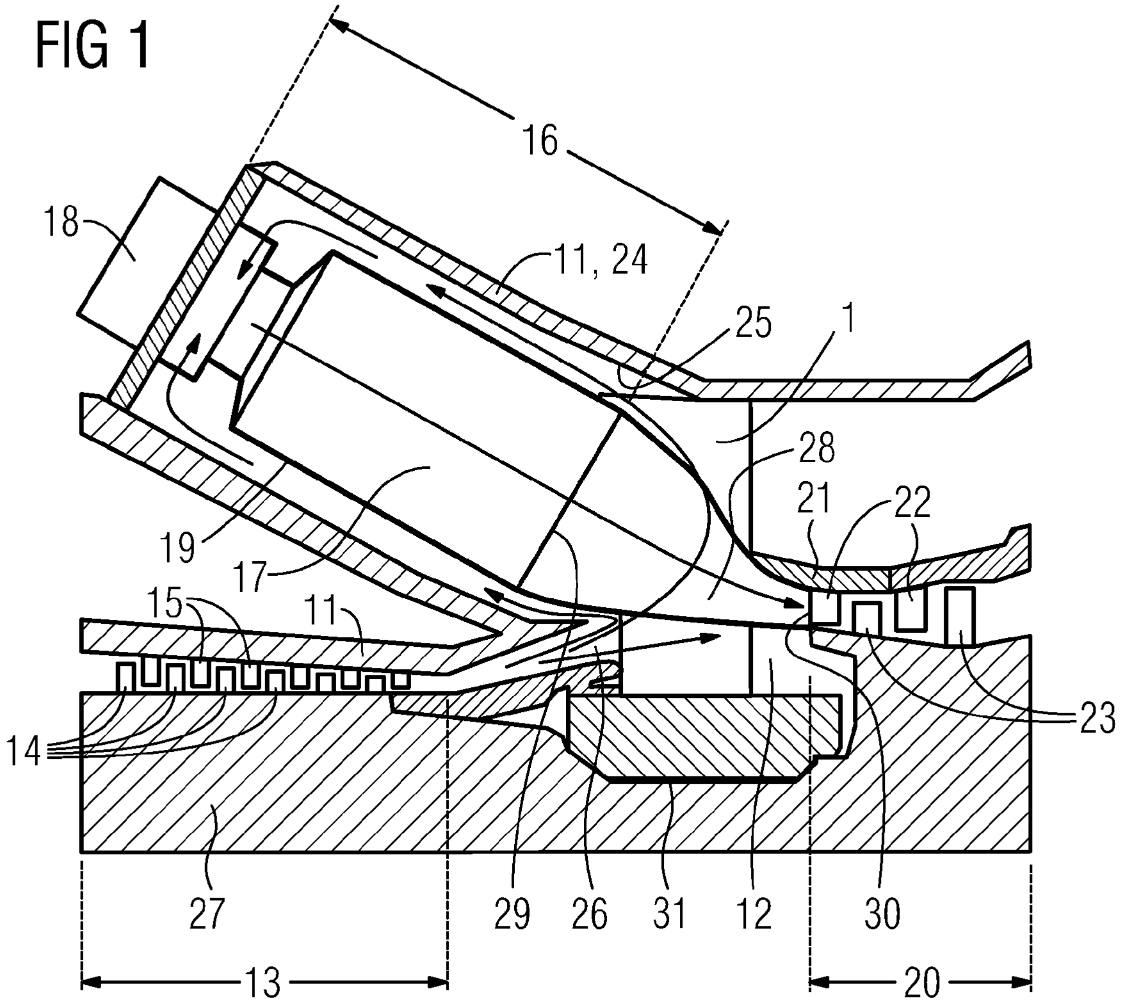
FIG. 1 shows in schematic view a longitudinal section through a gas turbine engine.

In the drawings like references identify like or equivalent parts.

DETAILED DESCRIPTION OF THE INVENTION

FIG. 1 shows a schematic view of part of a longitudinal section of an embodiment of a gas turbine engine. The engine comprises a compressor section 13, a combustor section 16 and a turbine section 20 which are arranged adjacent to each other on a longitudinal axis of the engine. A casing 11 surrounds the compressor section 13, the combustor section 16 and the turbine section 20.

In the compressor section 13, compressor blades 14 and compressor vanes 15 are grouped so as to form blade rings and vane rings, respectively. Blade rings are fixed to and rotating with the shaft 27, forming a rotor assembly. Compressor vane 15 rings are fixed to the casing 11 so as to be stationary with respect to the rotating shaft 27 and compressor blade 14 rings.

The combustor section 16 comprises one or more combustion chambers 17 and at least one burner 18 fixed to each combustion chamber 17. The combustion chamber 17 is, on one side, in flow connection with the compressor section 13 through the compressor outlet/diffuser 26 and, on the other side, in flow connection with the turbine section 20.

In the turbine section 20, similar to the compressor section 13, guide vanes 22 and turbine blades 23 are grouped so as to form guide vane 22 rings and turbine blade 23 rings, respectively. Turbine blade 23 rings are fixed to and rotating with the shaft 27. Guide vane 22 rings are fixed to outer carrier rings 21 which are supported by spokes 1 which are held in place by the outer casing 24.

During operation of the gas turbine engine, air is compressed and fed through the diffuser 26 to the centre casing area 12 (arrows in FIG. 1 indicate the different flow paths of compressor air).

From the centre casing area 12, one part of the compressed air flows between the outer casing 24 and the combustor liners 19 to the burners 18 where it is mixed with a fuel, to produce a fuel air mixture which is then burned in the combustion chamber 17. The mainstream gas formed by the combustion is led to the turbine section 20 where it expands and cools, thereby transferring momentum to the turbine blades 23 which results in the rotation of the shaft 27. The guide vanes 22 serve to optimize the impact of the mainstream gas on the turbine blades 23.

Another part of the compressed air traverses the centre casing area 12, omitting the combustor section 16, and flows between the spokes 1 and transition ducts 28, to provide cooling to the transition ducts 28, the inside surface 25 of the outer casing 24 and the nozzle guide vanes 22 at the entry of the turbine section 20. Aerodynamically shaped inventive spokes 1 will reduce flow separations behind the spokes 1. Flow guiding elements 6, advantageously being designed as aerodynamic vanes and chutes, will deflect the flow of compressed air from an axial direction to a circumferential direction, thus introducing a swirl, further reducing dead zones behind the spokes 1.

Figure 2:
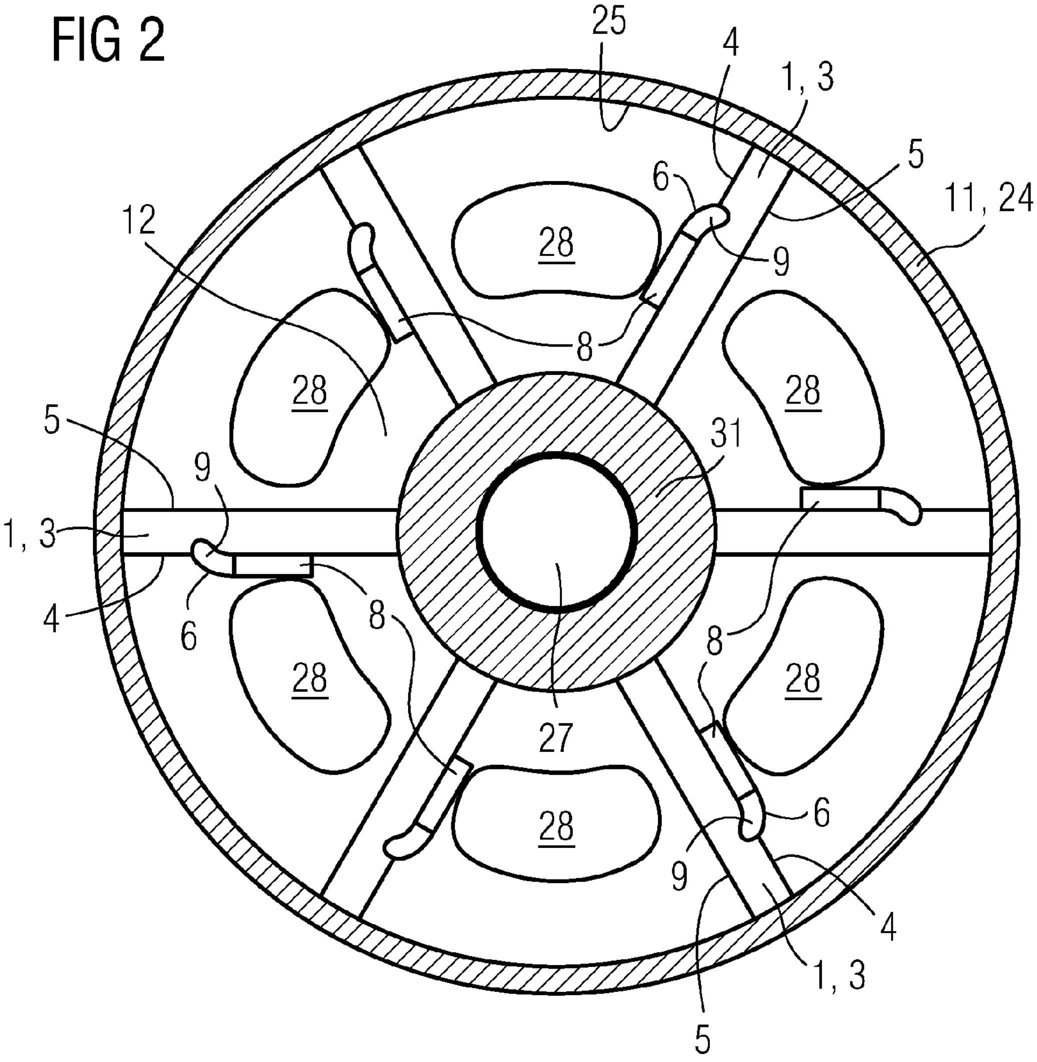
FIG. 2 shows the centre casing of the gas turbine engine of FIG. 1 in a cross-sectional view.

FIG. 2 shows a cross-sectional view of a gas turbine in upstream direction with a concentric arrangement of shaft 27, bearing 31, centre casing area 12 comprising six radially extending spokes 1 with flow guiding elements 6, and six transition ducts 28 arranged in between the spokes 1 and outer casing 24.

During operation, the only rotating part of FIG. 2 is the shaft 27, driven by the mainstream gases from separate combustion chambers 17 merged via transition ducts 28 to a common annular flow. In the sectional view of FIG. 2 the shape of the transition ducts 28 is depicted as a transitional shape between a circle, the shape of the first transition duct end 29 connecting to the circular combustion chamber 17, and an annular section, the shape of the second transition duct end 30 connecting to the turbine section 20.

Figure 3:
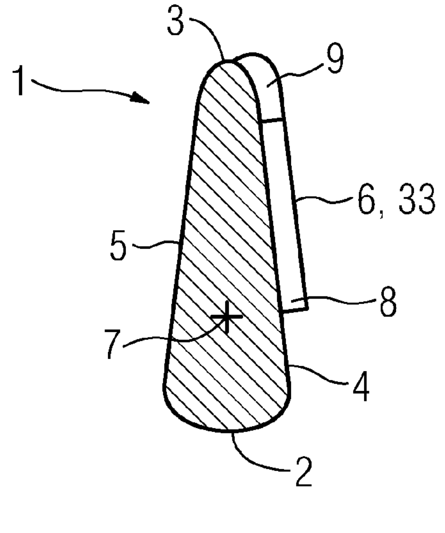
FIG. 3 shows the section through an embodiment of a spoke of the inventive casing.

A spoke 1 extends along a radial axis 7. With reference to FIG. 3, a cut through this radial axis 7 is shown, revealing the aerodynamic shape with a leading side 2 and a trailing side 3 and, extending from the leading side 2 to the trailing side 3, a first side 4 and a second side 5, opposite the first side 4. In this embodiment, the flow guiding element 6 is an aerodynamic vane 33 and arranged on the first side 4 and extending to the trailing side 3 of the spoke 1. The aerodynamic vane 33 is not straight, but bent, with a leading edge region 8 of the flow guiding element 6 being inclined relative to a trailing edge region 9 of the flow element 6. This bending is better seen in FIG. 5.

Figure 4:
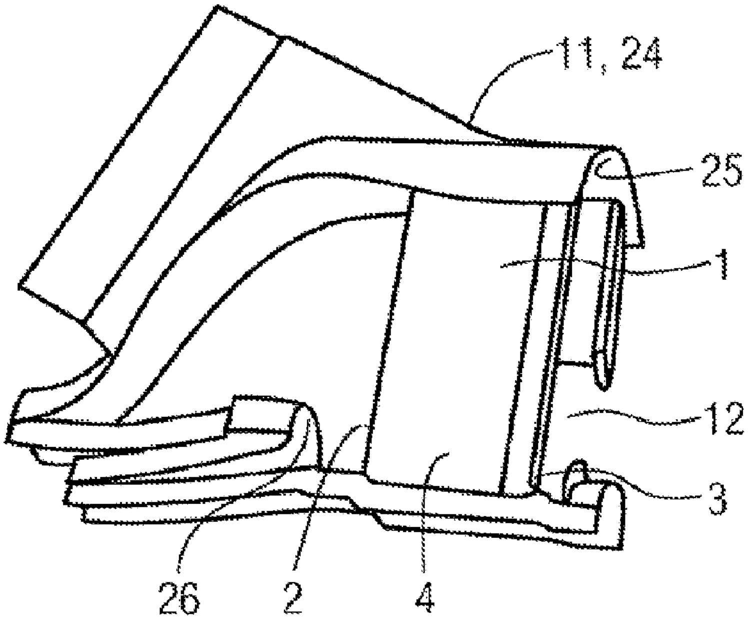
FIG. 4 represents a side view of a prior art centre casing with a spoke.
Figure 5:
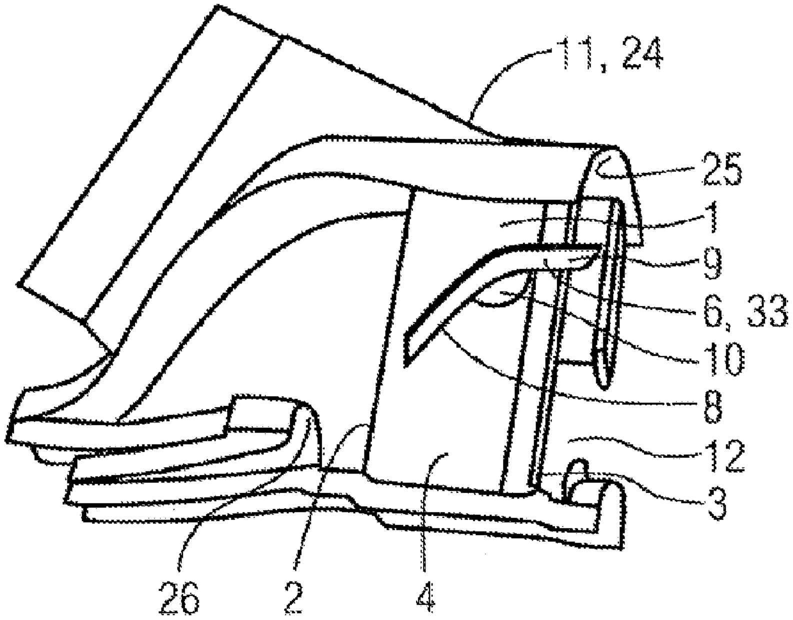
PRIOR ART FIG 5
FIG. 5 represents a side view of the inventive centre casing with a spoke.
Figure 6:
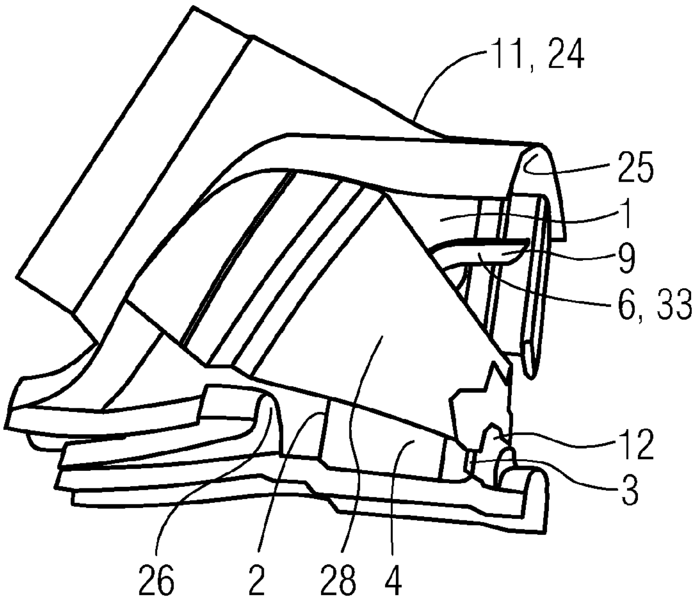
FIG. 6 represents a side view of the inventive centre casing with a spoke and a transition duct.

FIGS. 4 to 6 represent centre casing areas 12 with a spoke 1. FIG. 4 shows a spoke 1 in a prior art casing, arranged on an outer casing 24 after the diffuser 26.

FIG. 5 shows an embodiment of the spoke 1 of an inventive casing 11, with flow guiding element 6 arranged on the spoke 1. The flow guiding element 6 is an aerodynamic vane 33 and arranged in a central circumferential area relative to the radial axis 7 of the spoke 1 and extends to a trailing side 3 of the spoke 1. The aerodynamic vane 33 is not straight, but bent between a leading edge region 8 and a trailing edge region 9, showing a bending angle 10.

FIG. 6 shows the same embodiment as FIG. 5 with a transition duct 28 added to the assembly.

Figure 7:
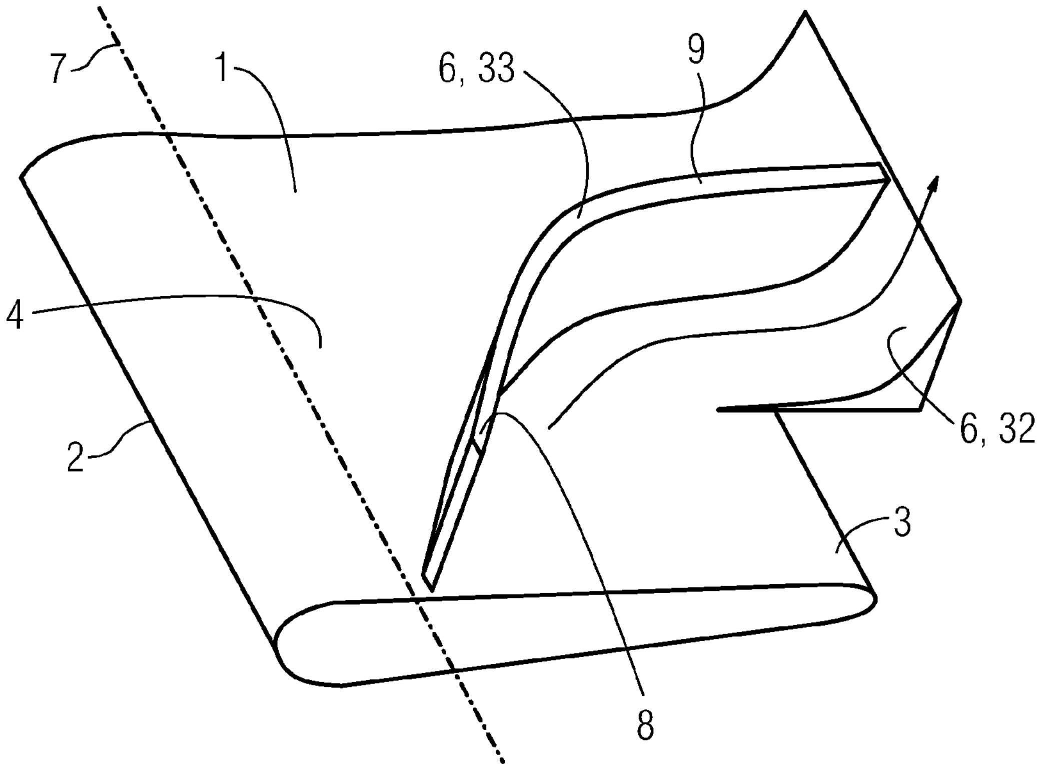
FIG. 7 represents a perspective view of an embodiment of the spoke with aerodynamic vane and chute.

FIG. 7 shows an embodiment of the spoke 1 with two flow guiding elements 6. As in the previous FIGS. 4 to 6, the aerodynamic vane 33 is arranged at a first side 4 of the inventive spoke 1 and the leading edge region 8 is inclined relative to a trailing edge region 9. As can be further seen from the embodiment of FIG. 7, the trailing edge region 9 shades off into a chute 32 arranged at the trailing side 3 of the spoke. The orientation of the chute 32 is such that compressed air (see arrow in FIG. 7), deflected from the aerodynamic vane 33, is turned from a substantially axial direction, parallel to the axis of the gas turbine engine, into a circumferential direction about the axis of the gas turbine engine.

What is claimed is:

1. A section of a gas turbine engine, the casing surrounding a combustor and comprising:

a casing, surrounding the combustor and comprising:

a radial spoke, the radial spoke includes an aerodynamic shape and comprises:

an upstream leading side, a downstream trailing side, a first side, a second side opposite to the first side, and a flow guiding element arranged on at least the first side, wherein the radial spoke is used as a support for a carrier ring of a turbine guide vane ring, whereby cooling air exiting a compressor diffuser flows between the spoke and a transition duct of the combustor, wherein the first side and the second side extend from the upstream leading side to the downstream trailing side, and wherein the flow guiding element is formed is such a way that a flow of cooling air exiting the compressor diffuser is deflected and turned circumferentially about the axis of the gas turbine engine, and wherein at least a portion of the downstream trailing side comprises a concave surface in the form of a chute that extends in the circumferential direction about the axis of the gas turbine engine.

2. The section as claimed in claim 1, wherein the radial spoke extends along a radial axis, and wherein the flow guiding element is arranged in a central circumferential area relative to the radial axis.

3. The section as claimed in claim 1, wherein the flow guiding element extends to the trailing side of the radial spoke.

4. The section as claimed in claim 1, wherein a plurality of flow guiding elements are arranged on the first side and the second side of the radial spoke.

5. The section as claimed in claim 1, wherein the flow guiding element comprises a metal.

6. The section as claimed in claim 5, wherein the flow guiding element comprises a sheet metal.

7. The section as claimed in claim 1, wherein the flow guiding element comprises a ceramic material.

8. The section as claimed in claim 1, wherein the flow guiding element comprises a plurality of filaments of carbon or Kevlar fibres.

9. The section as claimed in claim 1, wherein the flow guiding element is welded onto the spoke.

10. The section as claimed in claim 1, wherein the flow guiding element is brazed onto the spoke.

11. The section as claimed in claim 1, wherein the spoke and the flow guiding element are cast in one piece.

12. The section as claimed in claim 1, wherein the flow guiding element is an aerodynamic vane, extending to the downstream trailing side of the radial spoke, and wherein the aerodynamic vane is bent to redirect the flow of cooling air.

13. The section as claimed in claim 1, wherein the aerodynamic vane has a first surface and a second surface, wherein the first surface includes an upstream leading edge region and the second surface includes a downstream trailing edge region, and wherein the first surface is inclined relative to the second surface.

14. The section as claimed in claim 13, wherein a bending angle between the leading edge region and the trailing edge region is in a range between 120° and 170°.

15. The section as claimed in claim 14, wherein the bending angle is 150°.

16. The section as claimed in claim 1, wherein an angle of attack of the flow guiding element, relative to a cooling air streaming along the radial spoke, is adjustable, and wherein the cooling air exits the compressor diffuser.

17. A gas turbine engine, comprising:

a section, comprising:

a casing, surrounding the combustor and comprising:

a radial spoke, the radial spoke includes an aerodynamic shape and comprises:

an upstream leading side, a downstream trailing side, a first side, a second side opposite to the first side, and a flow guiding element arranged on at least the first side, wherein the radial spoke is used as a support for a carrier ring of a turbine guide vane ring, whereby cooling air exiting a compressor diffuser flows between the spoke and a transition duct of the combustor, wherein the first side and the second side extend from the upstream leading side to the downstream trailing side, and wherein the flow guiding element is formed is such a way that a flow of cooling air exiting the compressor diffuser is deflected and turned circumferentially about the axis of the gas turbine engine, and wherein at least a portion of the downstream trailing side comprises a concave surface in the form of a chute that extends in the circumferential direction about the axis of the gas turbine engine.

18. The gas turbine engine as claimed in claim 17, wherein the radial spoke extends along a radial axis, and wherein the flow guiding element is arranged in a central circumferential area relative to the radial axis.

* * * * *